Nov. 24, 1936.　　　　W. J. PHILP　　　　2,061,589
CONTROL DEVICE FOR CAN MACHINERY
Filed March 13, 1934　　　7 Sheets-Sheet 1

INVENTOR
William J. Philp
BY
ATTORNEYS

Nov. 24, 1936.　　　W. J. PHILP　　　2,061,589

CONTROL DEVICE FOR CAN MACHINERY

Filed March 13, 1934　　　7 Sheets-Sheet 2

INVENTOR
William J. Philp
BY
ATTORNEYS

Nov. 24, 1936. W. J. PHILP 2,061,589
CONTROL DEVICE FOR CAN MACHINERY
Filed March 13, 1934 7 Sheets-Sheet 3
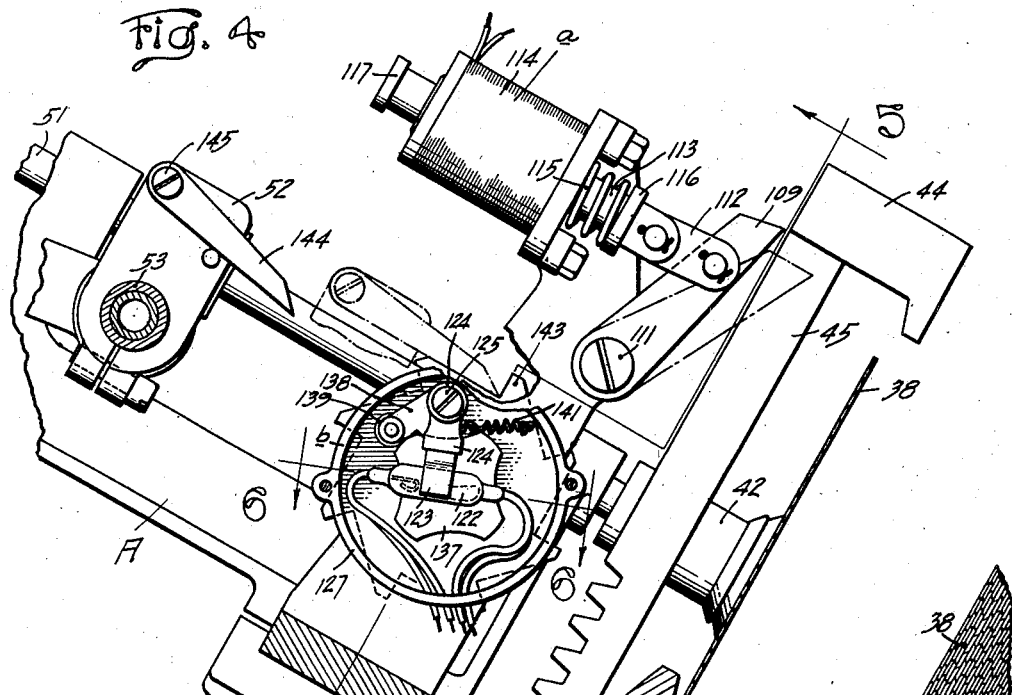
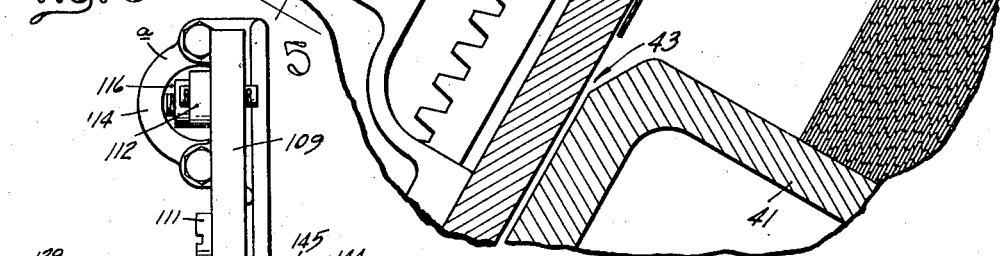
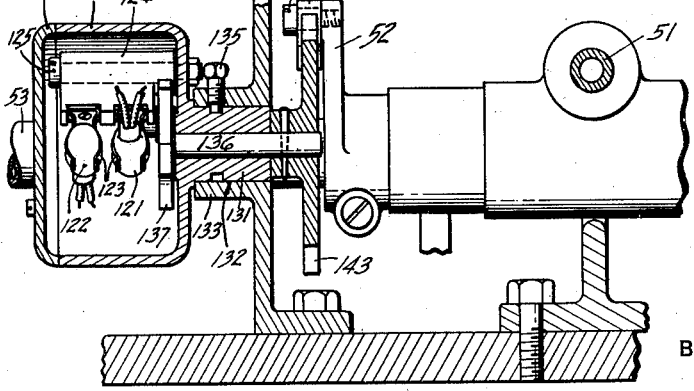
INVENTOR
William J. Philp
BY Ivan A. Thornburg
Charles H. Crisp
ATTORNEYS Nov. 24, 1936.    W. J. PHILP    2,061,589
CONTROL DEVICE FOR CAN MACHINERY
Filed March 13, 1934    7 Sheets-Sheet 4
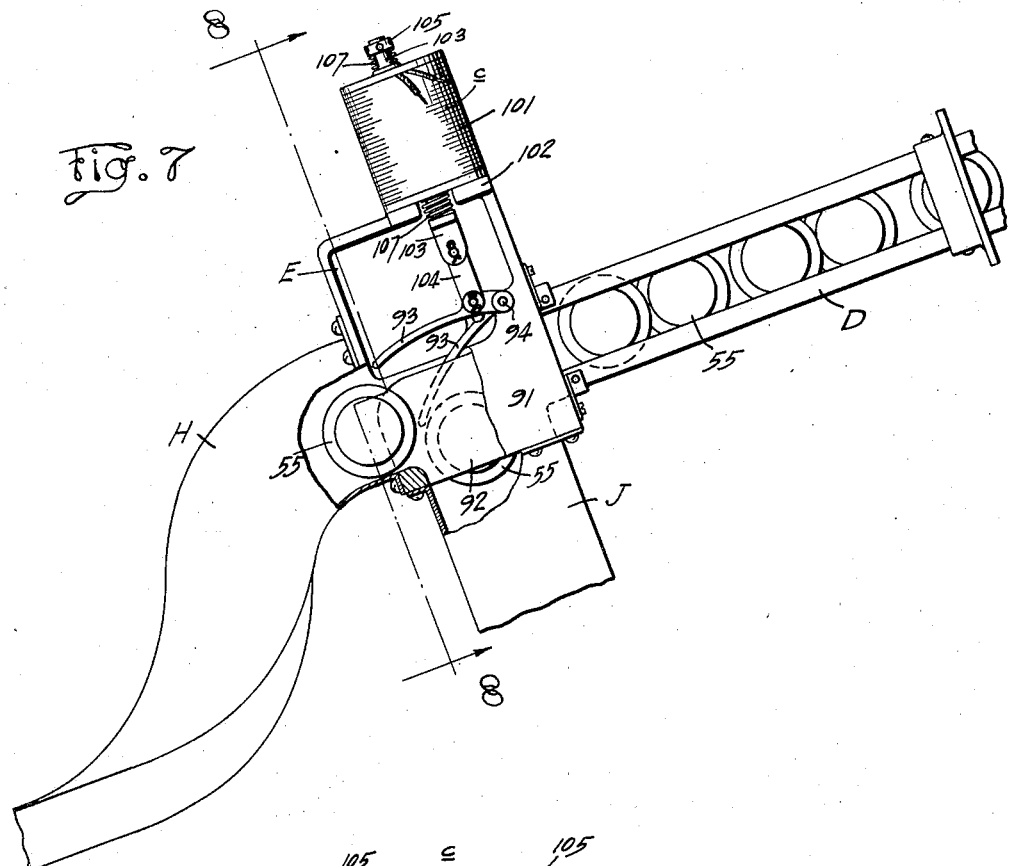
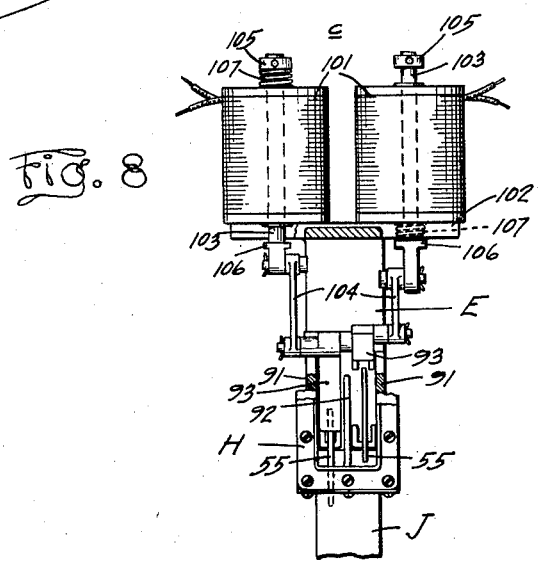
INVENTOR
William J. Philp
BY
ATTORNEYS

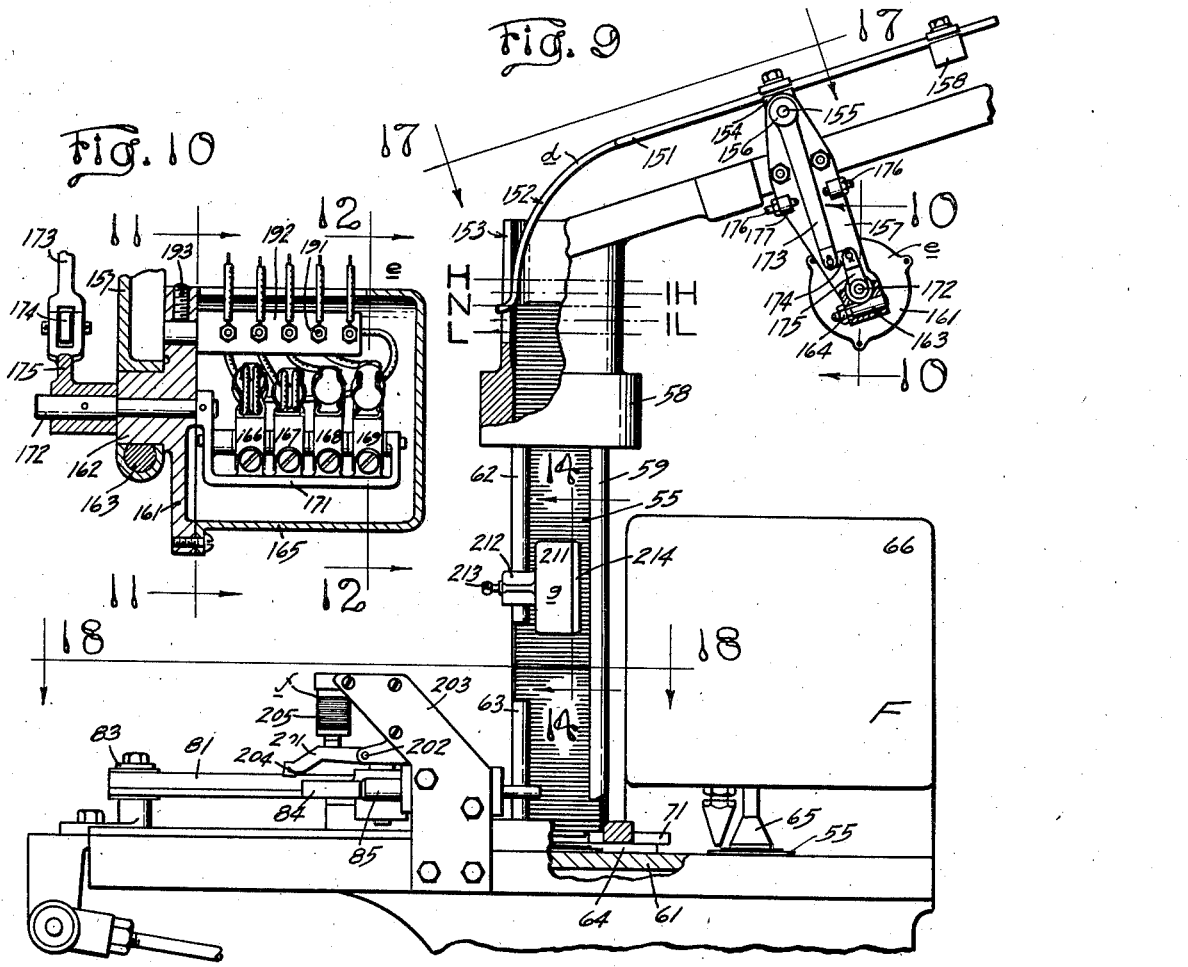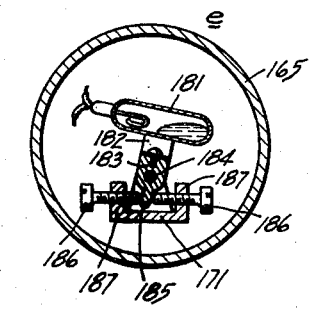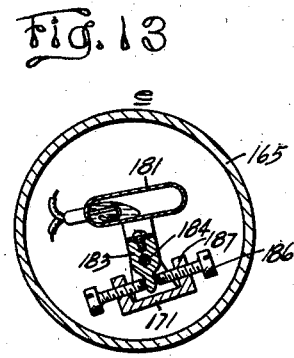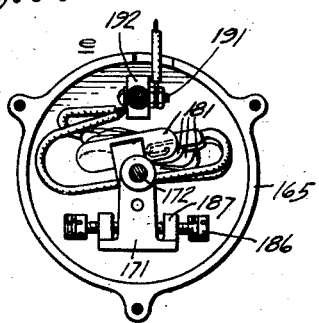

Nov. 24, 1936.  W. J. PHILP  2,061,589

CONTROL DEVICE FOR CAN MACHINERY

Filed March 13, 1934  7 Sheets-Sheet 6

INVENTOR
William J. Philp
BY
ATTORNEYS

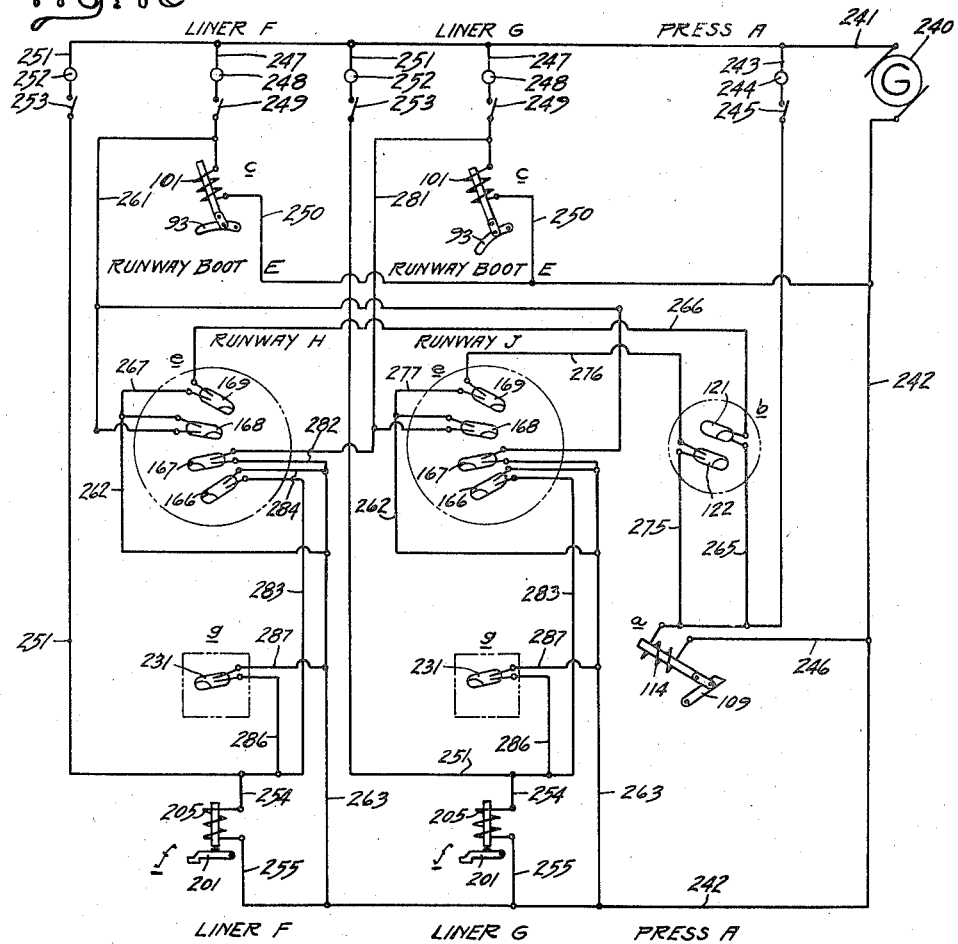

Patented Nov. 24, 1936

2,061,589

UNITED STATES PATENT OFFICE 2,061,589

CONTROL DEVICE FOR CAN MACHINERY

William J. Philp, Melrose Park, Ill., assignor to American Can Company, New York, N. Y., a corporation of New Jersey Application March 13, 1934, Serial No. 715,362

16 Claims. (Cl. 113—114)

The present invention relates to can manufacturing machines and has particular reference to automatic control devices for the same by means of which can parts or the like pass from one unit in a can line to other units with synchronized automatic movements so that one unit will not be improperly supplied at the expense of another.

An object of the present invention is the provision of a fully automatic control for a line of can machinery wherein the operation of one machine or unit in the line is regulated by other machines or units, one unit performing its particular operation on the same can part which has been or will be operated on in another unit.

Another object of the invention is the provision of an electric automatic control for a plurality of machines performing operations upon can parts, this control diverting can parts, that have previously been acted upon by other machines in the series, into subsequent operation machines so that the can parts are distributed to machines performing the subsequent operations in accordance with their individual requirements.

A further object of the invention is the provision of elements in an electric control for a line of can machines which function to diminish or cut off in whole or in part the supply of can parts at the source when there is an excess and when requirements for such parts in other machine units decrease or entirely stop.

Yet another object of the invention is the provision of electric control devices associated with a can end automatic feeding, forming press and a plurality of can end lining machines, such control devices regulating the forming operations in the press by partially or completely stopping some of the press feeding movements, the distribution of the formed can ends into the lining machines being made as their individual needs require.

Another object of the invention is the provision of electric control devices for stopping the operations of individual machine units in the line when the supply of can parts for such machine units falls below a predetermined quantity sufficient for proper feeding in the individual machine.

A still further object of the invention is the provision of a control device associated with the feeding of can parts into an operating machine which stops such feeding if the can parts are out of order or are improperly received.

Numerous other objects and advantages of the invention will be apparent as it is better understood from the following description, which, taken in connection with the accompanying drawings, discloses a preferred embodiment thereof.

Referring to the drawings:

Fig. 4 is a part sectional, part elevational view on a larger scale of a portion of the can end forming press, illustrating the blank or strip feeding features as they particularly relate to the line control mechanism;

Fig. 5 is a sectional view taken at right angles and viewed substantially along the broken line 5—5 in Fig. 4;

Fig. 6 is a fragmentary sectional detail of the mercury switch elements in the control for the press, the point of view being indicated by the section line 6—6 in Fig. 4;

Fig. 7 is a side elevation, partly broken away, of a portion of the can end runway part of the can line, showing in addition a can end divider associated with the runway;

Fig. 8 is a sectional detail taken substantially along the line 8—8 in Fig. 7;

Fig. 9 is a side elevation partly broken away and partly shown in section of a can end magazine and adjacent parts of one of the can end lining machines of the can line shown in Fig. 1, the view being on an enlarged scale;

Fig. 10 is a sectional view on an enlarged scale of mercury switch elements of the can end lining runway as viewed substantially along the section line 10—10 in Fig. 9;

Figure 14:
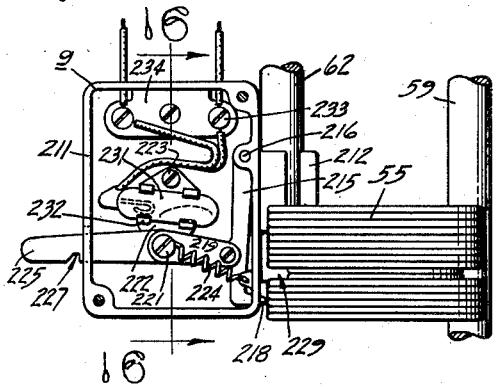
Figure 15:
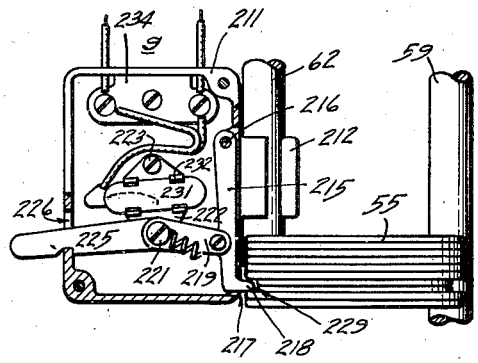
Figure 17:
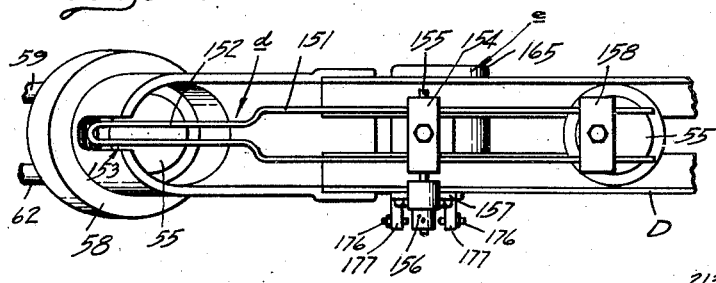
Figure 16:
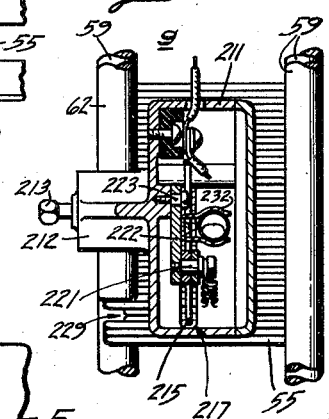
Figure 18:
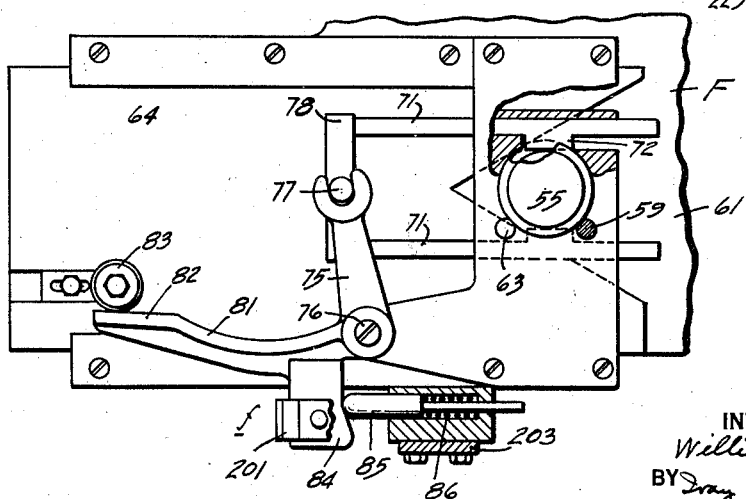

Figs. 11 and 12 are sectional details taken substantially along the lines 11—11 and 12—12 in Fig. 10;

Fig. 13 is a view similar to Fig. 12 showing the same parts in different positions;

Figs. 14 and 15 show different positions of the same parts being enlarged details of a portion of a can end lining magazine and associated control switch as viewed from a position indicated by the line 14—14 in Fig. 9, some of the can ends having been removed;

Fig. 16 is a sectional detail of the same parts taken substantially along the line 16—16 in Fig. 14 and illustrating more can ends in the magazine;

Fig. 17 is a top plan view of the runway and magazine shown in Fig. 9, being viewed from a position indicated by the line 17—17 in that figure;

Fig. 18 is a sectional plan view taken substantially along the line 18—18 in Fig. 9; and Fig. 19 is a wiring diagram of the electric control devices illustrating the electric circuits.

Figure 1:
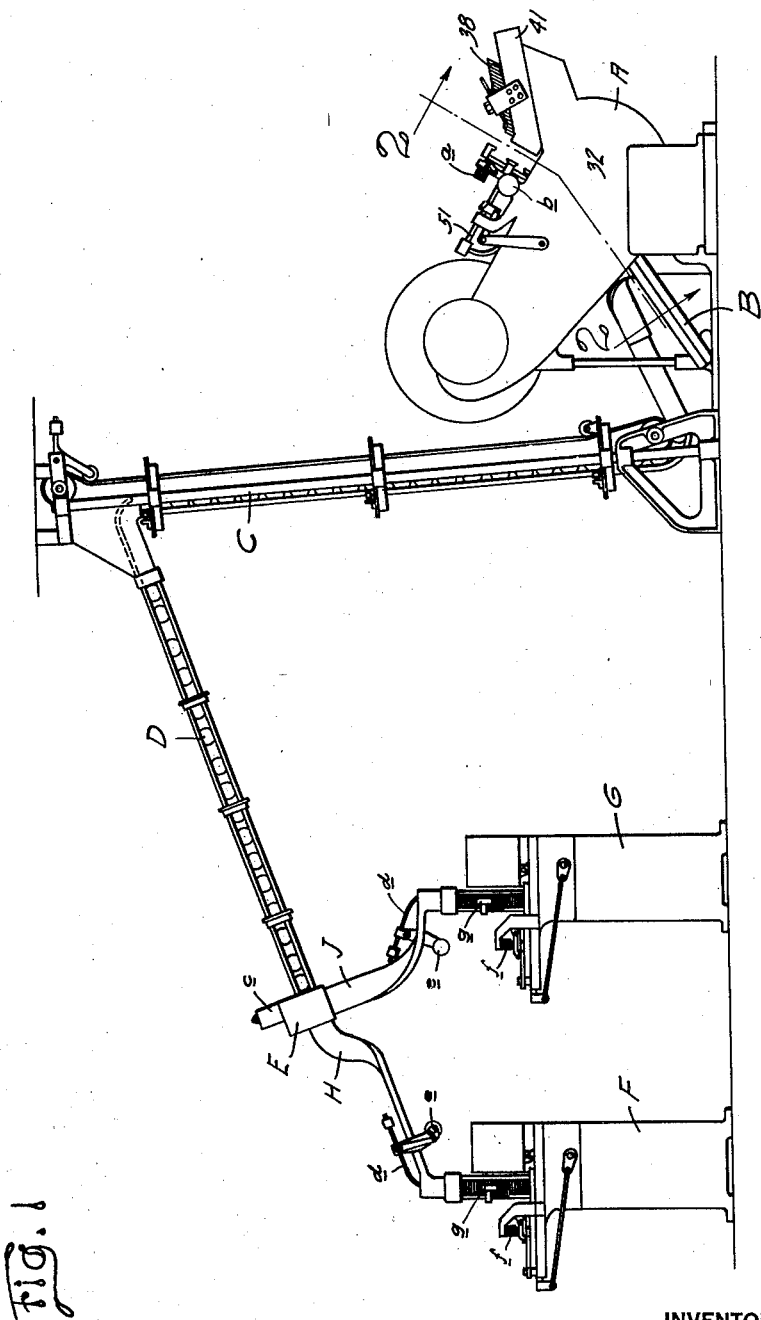
Figure 1 is a schematic view of a line of can machinery showing in elevation a preferred embodiment of the present invention.

As an exemplification of one embodiment of the present invention as it may be applied in a line of can machinery there is illustrated in the drawings and particularly in Fig. 1 the essential parts of the connected and the connecting machine units. This includes a can end forming press A, can end curlers B, elevator C, a runway D, a runway divider boot E and two can end lining machines F and G. The lining machine F is connected to the divider boot by a quarter twist runway H and a similar type of runway J joins the other lining machine G with the boot E. All of these units are connected together and provide a complete series of can end operating elements.

The feeding of the material into the strip feed press A is interrupted in certain cases and a stop unit $a$ located in the press is used for this purpose. Stop unit $a$ is electrically connected with a timing switch $b$ also in the press and these are electrically associated with a dividing switch device $c$ of the runway divider boot E and with accumulative trip devices $d$ which operate mercury switch elements $e$, both trips and switches being located on the runways H, J of the lining machines F, G.

A further control is also utilized to stop the feeding of the can ends into each lining machine if one or more ends are improperly arranged in the machine magazine. For this control a stop unit $f$ is used and one such unit is located in each lining machine magazine. These stop units are electrically connected with trip devices $g$ located adjacent.

The operation of these various control units will be fully described in detail hereinafter. The general sequence which will be followed in such presentation will include, first a consideration of the operating parts of the machine units, particularly the strip feed press A, the lining machines F, G and the runway boot E. An understanding of these features provides a basis for consideration of the mechanical switches and stop elements in the line control which will next be described. Finally the full operation of the controls will be followed from the electrical standpoint, this description being centered around the wiring diagram of Fig. 19.

The can end forming press A illustrated in the drawings is of the double die stagger automatic strip feed type wherein blanks of sheet material such as strips of scroll cut tin plate are individually fed from a magazine and through the forming dies of the press. During a larger percent of the operating time two can ends are produced at each stroke of the press. Each end falls into a separate chute and is conveyed to its associated rotary flange curler B.

Each curler B curls the flange of the formed can end and positions it into one side of a double line elevator C which raises and discharges it into one side of a double track inclined runway D. There is thus a simultaneous passage of the two can ends through the curlers B, through the two lanes in the elevator C and the runway D these ends separately passing into the runway divider boot E.

Can ends from both of the two lanes or lines leading into the divider boot, may then be directed into a single line in the runway H of the can end lining machine F or into a single line in the runway J of the liner G, or the ends from one line may go into one machine and the ends from the other line go into the other lining machine. Such travel is controlled by the device $c$ in the divider boot E and this device in turn is set automatically to supply the lining machines with can ends as needed, this sometimes being done electrically by the trip devices $d$ and sometimes by springs in the device $c$.

If can ends are fed to one liner faster than the liner can handle them so that they are stacked up in the lining machine magazine the associated trip device $d$ operates the switch device $c$ in the elevator boot and the ends are diverted into the other liner. The operation of one of the lining machine accumulator trip devices $d$, besides shifting the flow of cans from the runway boot into the runway of the other lining machine, may also partially stop the feeding of strips into the press A. This will depend upon the accumulation of the can ends and also upon the position of the timing switch $b$ as will be later described in detail.

In case both lining machines have more than a sufficient supply of ends, the feeding of the strip material into the can end forming press A is fully and automatically stopped by actuation of the stop unit $a$ through the trip devices $d$. This provides that at no time will the supply of can ends in any lining machine exceed the number that particular machine can properly handle.

Referring more in detail to the machine units embodied in the can line, the can end forming press A will first be briefly considered. Such a press comprises a main frame 32 (Figs. 1 and 2) having a bolster plate 33 (Fig. 3) on which a lower die member 34 is carried. An upper die member 35 is carried in a slide 36 in the usual manner.

Formed strips or blanks 38 (Figs. 2 and 3) are stacked in a magazine 41 and from the magazine are individually and automatically fed to the can end forming dies 34, 35. Separation of a strip 38 from the magazine may be effected in the usual manner as by sucker heads 42. These sucker heads bring each blank or strip 38 into position above a feed slot 43 located adjacent the lower end of the magazine 41 and from this position the strip is forced down into the slot by fingers 44 which are carried on reciprocating slide bars 45. After a strip has been introduced into the feed slot 43 it is intermittently advanced into proper cutting position relative to the dies 34, 35 by a reciprocating feed bar 46 (Figs. 2 and 3), this being a usual construction in strip feed presses.

Figure 2:
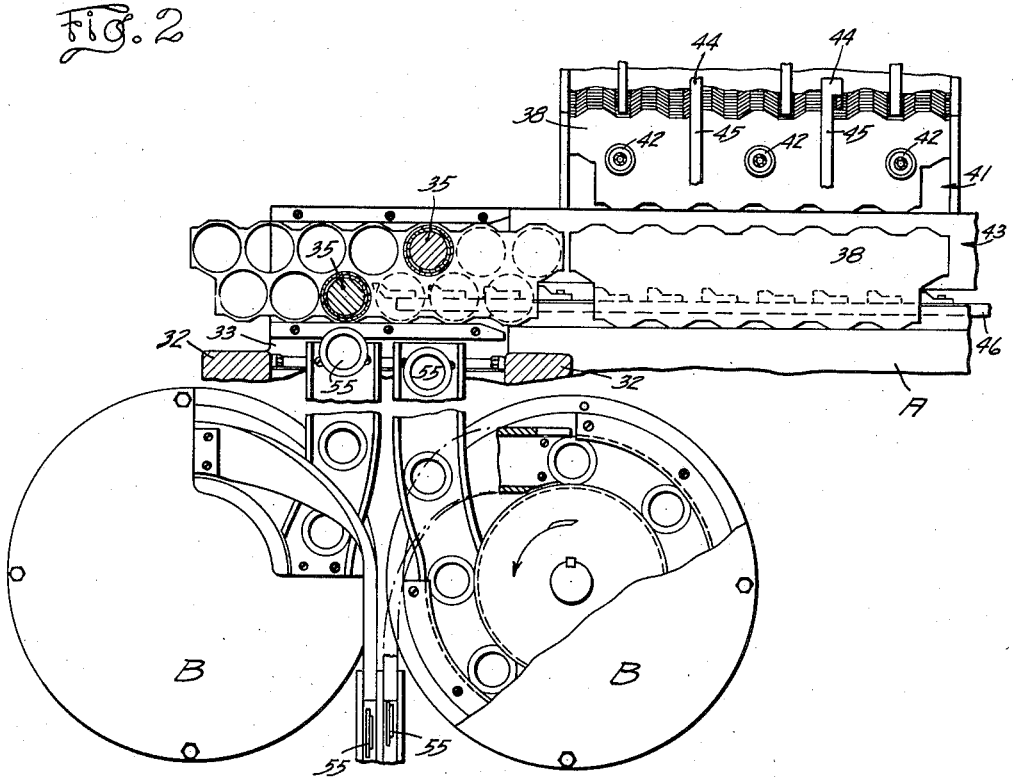
Fig. 2 is a sectional view of a can end forming, strip feed press of such a line, shown on an enlarged scale, as viewed along the broken line 2—2 in Fig. 1, parts being broken away.
Figure 3:
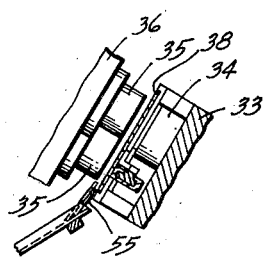
Fig. 3 is a fragmentary sectional detail of can end forming dies in the can end forming press.

The sucker heads 42 are mounted on the lower ends of inclined sliding or reciprocating hollow shafts 51 (Figs. 1, 2 and 4). Three such sucker heads are shown in the drawings. The three hollow shafts 51 move as a unit, each shaft being connected by a clamp block 52 to a movable transverse pipe or bar 53 which provides the proper movement for the sucker heads 42, this also being a standard construction.

The drawings disclose two sets of lower and upper dies 34, 35 (Fig. 3) and the strips 38 are therefore of a dimension to contain two rows of can end spaces. The particular layout disclosed as one example of a strip includes a short row and a long row providing the necessary can end spaces for six can ends (the can ends being designated by the numeral 55) which are cut from the short row and seven can ends similarly cut from the long row.

In accordance with the cutting layout shown, at each of six strokes of the press one end is blanked out from each row and is formed, while at the seventh stroke the seventh end is taken out of the long row. One of the lines of can ends coming into the divider boot E therefore contains less than the other line. This is only by reason of the particular layout for the press cutting herein shown. It will be obvious that a different layout producing an equal number of can ends could be run if desired. This inequality is at all times compensated for by the electric control devices which control from the lining machine or receiving end of the can end line rather than from the press or producing end and the unequal line is purposely selected to better illustrate the operation of the controls.

The runway H at its lower end joins to the top of a vertically disposed magazine for the lining machine F and in a similar manner the runway J connects into a magazine of the lining machine G. The two lining machines including their magazines are identical in construction and a brief description of the one, which will now be given, will suffice for both. The machine F is selected for this purpose and reference should now be had to Fig. 9.

The can ends 55 roll into the runway H on edge but are turned by the twisted pass of the runway so that the ends slide in a horizontal plane into the top of the magazine where they fall through a tubular head 58 and between four vertical rods forming the magazine proper. Three of these rods (designated by the numeral 59) extend up from and are indirectly carried by a table 61 (see also Fig. 18) forming a part of the frame of the lining machine and carry on their top ends the head 58 which may be an integral part of the conveyor H. The fourth rod, designated by the numeral 62, is suspended in the head and extends about halfway down. Spaced below its lower end and in vertical alignment is a second short rod 63 mounted on the table 61. This leaves an opening between the adjacent ends of the short rods, the purpose of which is to permit easy removal of improperly placed can ends which may come into the stack. More details of this will be given later. The can ends accumulate in the magazine, resting in stack position in the usual manner.

As a part of the regular can end lining machine operations the can ends are individually removed from the bottom of the stack and are fed forward in any suitable manner. A typical can end feed will be described and this comprises a feed slide 64 which moves back and forth over the table 61. The feed slide deposits the can ends below a lining nozzle 65 (Fig. 9) or any other suitable lining element of a lining head 66.

A pair of slide bars 71 may be used to separate the lowermost end from the stack prior to its removal by the feed slide 64. These bars extend through the lower part of the magazine and when moved back into the position of Fig. 18, separating elements formed as projecting ledges 72 on the inner edges of the bars pass across the stack of can ends in the magazine just above the lowermost end and support the rest of the stack.

Slide bars 71 are moved back to support the stack each time the feed slide 64 moves back so that a separated can end is in front of the slide ready to be advanced as soon as it again moves forward. Movement of the feed slide is communicated to the slide bars through the medium of a bell crank lever 75 pivoted at 76 on the frame of the lining machine. One arm of this lever loosely connects at 77 to a cross head 78 which joins the rear ends of the slide bars 71 and the other arm is curved at 81 to provide a cam surface on its inner side wall. The lever arm terminates in a straight wall section 82.

A cam roller 83 is carried by the feed slide 64 and is in engagement with either of the lever arm parts 81, 82 during the cycle of movement forward and back. When this roller rests against the straight part 82 (Fig. 18) the slide bars 71 are back and their projecting ledges are supporting the stack of can ends in the magazine with a separated end in position below the slide bars and in front of the feed slide. On the forward stroke of the feed slide the roller 83 passes from the straight wall 82 and engages the curved wall 81 of the lever arm.

An extension 84 of the bell crank lever arm is engaged at all times by a spring barrel 85 sliding in the frame of the machine and this barrel is backed up by a spring 86. This construction of spring and spring barrel urges the bell crank lever 75 in a clockwise direction (Fig. 18) and keeps the lever arm against the cam roller 83 so that as soon as the roller engages the cam surface 81 of the lever arm the bell crank lever under the spring action swings on its pivot 76 and this slides the bars 71 forward and carries their projections 72 out from beneath the stack of can ends in the magazine.

The stack of can ends thereupon moves down and rests on the top of the feed slide 64 in position where the lowermost can end in the stack is just beneath the horizontal plane of movement of the slide bar projections. The feed slide 64 moves back and its roller 83 passes along the cam wall 81 and again engages the arm surface 82. This brings the slide bars back and their projections again pass under and sustain the stack of can ends, leaving the lowermost end free to fall down on the table 61 and in front of the feed slide.

The line switch or can end diverting features of the runway boot E will now be considered and reference should be had to Figs. 7 and 8. The runway boot is formed as a hollow housing having side walls 91 and an intermediate partition wall 92 parallel to the side walls. This provides two runs or passages alongside of one another for the two lines of can ends rolling down the runway D.

The upper end of the runway J opens into the open bottom of the housing and the upper end of the runway H opens into the open side of the boot housing which is directly opposite the discharge end of the runway D. The momentum gathered by the rolling can ends coming down the incline of the runway D is sufficient, if the ends are unrestricted, to permit them to jump over the upper open end of the runway J, as they pass in between the wall 92 and a side wall 91, and to come into the open end of the runway H. Such a can end shown entering the mouth of the runway H is disclosed in Fig. 7.

Provision is made for preventing, at certain times, the can ends in either of the lines from entering the open end of the runway H. A pair of diverting fingers 93 are pivotally mounted on a transverse pin 94 which is held in the side walls 91 of the boot housing. There is a finger 93 for each line, one on each side of the partition wall 92. Its pivotal mounting is at one end and is adjacent the receiving side of the boot housing.

These diverting fingers each have a raised position and a lowered or diverting position. In Fig. 7 are disclosed both positions, the forward finger being shown in its raised position and the rear finger in its lowered or diverting position. When both fingers are in these positions the can ends passing in front of the partition wall 92 are unrestricted in their movement through the elevator boot and therefore pass into the runway H, while those on the back line strike against the associated depressed finger 93 and are diverted down into the open end of the runway J.

As long as the fingers remain in the position shown all of the can ends in the forward line will be fed into the lining machine F through its runway H while those in the back line will pass into the runway J and thence into the lining machine G. This is the normal position for each finger and each finger is so held against the action of an associated spring by an electric circuit included in the electric control devices. The shifting in position, that is, the lowering or raising of a finger 93 is effected by a combined action of the dividing switch devices c and their springs.

There are two solenoids 101 (Figs. 7 and 8) for the switch devices c and these are arranged side by side and are carried on an upper or top part 102 of the elevator boot housing. Each solenoid is provided with a vertically movable core 103 which extends through it and the bottom end of each core is pivotally connected by a link 104 to its associated diverting finger 93. The top end of each core above the top of the solenoid carries a collar 105 and the lower end of each is enlarged in a circular shoulder 106.

Each solenoid core carries a spring 107. The solenoid on the near side, as viewed in Fig. 7, this being to the right as in Fig. 8, has its spring between the shoulder 106 and the bottom of the solenoid. In the other solenoid the spring 107 is confined between the top of the solenoid and its collar 105, each spring surrounding its solenoid core. Each spring when allowed to expand reverses the switch position, the front spring then lowering its solenoid core, the back spring raising the other core, this action likewise moving the finger 93 with which it is connected. The normal position of the fingers previously mentioned as referred to Figs. 7 and 8 is with the springs held compressed, the solenoids both being energized at such time. The shifting of a diverting finger will be fully discussed in connection with the electrical consideration of the control devices.

The mechanical features of the stop unit a of the press A will next be considered and reference should be had to Figs. 4 and 5. The stop unit is actuated electrically when an accumulation of can ends pile up to a given position in either of the two runways H and J. This actuation may be only momentary, stopping the feeding of some of the strips, or where there are more than enough ends to supply the two magazines of both of the lining machines F and G all strip feeding will cease until the crowded condition is alleviated. This will be fully described in the following pages.

Stop unit a comprises a stop finger 109 mounted at 111 on the frame of the press. This finger is adapted to be moved in the path of one of the descending strip inserting fingers 44 and when in such position (indicated in broken lines in Fig. 4) prevents downward movement of the fingers. The strip 38 held at such time by the suction heads 42 will not be moved down into the feed slot 43 but will stay on the suction heads while they make the usual movement back into the press magazine and out again.

This suction head movement for the layout shown will only take place every seventh stroke of the cutting dies 34, 35 and strip feed bar 46. The finger 109 is connected by a link 112 to one end of a solenoid core 113, which extends through and has movement in a solenoid 114 mounted on the frame of the machine adjacent one of the slide bars 45.

A spring 115 is mounted on the solenoid core 113 and is located between the bottom of the solenoid and a circular shoulder 116 formed on the core. The normal position of this device (Fig. 4) is with the spring 115 compressed and the finger 109 clear of the strip inserting finger 44. A stop collar 117 on the other end of the core is then free of the solenoid but engages it when the spring throws the finger 109 into the stop position. An energizing of the solenoid holds the finger free, the details of which will be described in connection with the electrical circuit.

There being two can end lining machines F and G and only one can end forming press A it is desirable for each accumulative trip device d in each of the lining machine runways H and J to operate on a different circuit acting upon the press stop unit a. Such is the function of the timing switch b which alternates between the two trip circuits at each successive stroke of the suction heads 45. This will be better understood when the wiring diagram is discussed but at the present time the mechanical construction of the timing switch may be considered.

This timing device b comprises a pair of mercury switches 121, 122 (Figs. 4, 5 and 6) mounted parallel to and adjacent each other and held in spring clamps 123 which are secured to a block 124 pivoted on a shouldered stud 125. This stud is secured to a rear wall of a switch housing 127 which is closed in front by a cover plate 128. The housing 127 is extended rearwardly in a hub 131 mounted in a bore 132 of a boss 133 formed in the frame of the machine. A setscrew 135 may be used to hold the hub and switch housing in stationary position. The hub 131 also forms a bearing for a short horizontal shaft 136 which carries an edge cam 137 at its end inside the housing 127.

The switches 121, 122 may be tilted by shifting of the block 124. To provide for such movement the block is formed with an actuating arm 138 which carries a cam roller 139 engaging the periphery of and cooperating with the cam 137. The roller is so held in engagement by a spring 141 secured at one end to the block and at the opposite end to the inside wall of the housing. This cam 137 with its shaft 136 is intermittently rotated. Shaft 136 extends beyond the rear end of the bearing hub 131 and carries a ratchet 143. This ratchet is operated by an aligned pawl 144 which is pivoted on a screw 145 secured to one of the blocks 52.

On each downward stroke of the shafts 51 and the sucker heads 42 (which, it will be recalled, takes place when a new strip 38 is to be raised from the press magazine) pawl 144 engages a tooth of the ratchet 143. The action of pushing against the tooth revolves the shaft 136 and its cam 137. The periphery of the cam 137 is formed with alternate high and low spots and at each succeeding step movement of the cam, roller 139 passes from a high spot to a low spot or from a low spot to a high spot and this oscillates the arm 138 and the block 124 and changes the positions of the mercury switches 121, 122.

Electric contact points entering the two bulbs of these mercury switches are in reversed order as illustrated in Fig. 6. That is, both contacts for the front switch come into the left end of the bulb while those for the back switch are in the right end. This insures that each time the block 124 is moved one switch is closed by its mercury flowing into the end of the tube and electrically connecting the contact points while the other switch is open since its mercury leaves its contact points. Upon the next movement of the block this condition is reversed.

The switch 121 is a part of one of the high or accumulative can end magazine circuits embodying one of the can end liners while the switch 122 is part of a similar circuit for the other liner. For each stroke of the suction cup shafts 51, therefore, one of the mercury switches is closed and the other is opened. The effect of this opening and closing will be further explained in detail in connection with the wiring diagram.

The mechanical structure of the accumulative trip devices $d$ and their associated mercury switch elements $e$ will be considered at this time and reference should first be had to Figs. 9 and 17. These figures illustrate the discharge end of the runway H and the accumulative trip device $d$ and switch $e$ associated with the can end liner F. It will be recalled that the runway J is also provided with a trip device $d$ and mercury switch element $e$ of identical construction.

As the can ends pass into the magazine head 58 and leave the discharge end of the runway they pass under but do not actuate a trip finger 151 which is preferably formed in a looped double wall member as shown in the drawings. The forward end of the trip finger is bent as at 152 and extends into the magazine head 58, a slot 153 cut in the wall of the head affording clearance for the finger end. The finger 151 is balanced near its center on a block 154 which is connected with a pivot shaft 155 and this is mounted for oscillation in a boss 156 formed in a bracket 157 secured to one side of the runway H.

The finger 151 is adjustably weighted at 158, this serving to counter balance its forward end 152. When the can ends 55 build up in the magazine and the top of the stack extends into the magazine head 58 each incoming can end as it settles in the stack engages the end 152 of the finger 151 and lifts it in a series of step movements which rock the finger in its pivotal mounting in the boss 156.

The position of the uppermost can end in the stack therefore determines the position of the finger 151 relative to the runway and this difference in position of the finger is correspondingly transmitted to the mercury switch device $e$. In Fig. 9 the horizontal dot-and-dash lines marked H, IH, N, IL and L designate five different positions corresponding to high, intermediate high, normal, intermediate low and low conditions of the stack.

There is a corresponding position for certain elements in the mercury switches $e$, for each stack level and these positions affect the control devices as will be fully explained in connection with the later consideration of the wiring diagram.

The mercury switch element $e$ in each runway H, J comprises a supporting disc 161 which is formed with a hub 162 carried in the lower end of the bracket 157. The position of this disc and the switch elements carried thereby may be changed relative to the bracket 157 and a clamping bolt 163 frictionally holds the hub 162 in a desired adjusted position relative to the bracket. A clamp nut 164 threadedly engaging the bolt 163 is used for locking the parts in adjusted position. The mercury switch elements, carried on the disc 161 are enclosed within a housing formed by a cylindrical cover member 165 secured to the disc.

There are four mercury switches confined within the cover member 165 being broadly designated by the numerals 166, 167, 168 and 169. These switches are arranged alongside of each other and each is associated with its own electric circuit. All of these switches are carried in a U-shape bracket 171 the inner leg of which is pinned to a horizontal rock shaft 172 mounted within the hub 162 of the disc 161. A rocking of the shaft 172 shifts the bracket 171 into different positions so that the mercury switches are also differently disposed, this having its corresponding electrical effect.

Rocking of the shaft 172 is in unison with the movement of the finger 151. The shaft 155 carries an arm 173 which extends down alongside of the bracket 157. This arm at its lower end is loosely connected by a link 174 into the upper end of an arm 175 which is secured to the end of the rock shaft 172. A lifting of the end 152 of the finger 151 therefore swings the lower end of the arm 173 toward the left (Fig. 9) and this moves the shaft 172 counterclockwise, whereas a lowering of the front end of the finger will reverse the direction of rocking of the shaft 172.

Setscrews 176 threadedly engaged in lugs 177 formed in the face of the bracket 157 and positioned on opposite sides of the arm 173 provide limiting stops for the arm and determine the amount of its swing in either direction.

Each mercury switch 166, 167, 168 and 169 includes a glass bulb 181 (Fig. 12) which contains the usual contact points extending into one end of the bulb and the usual mercury globule. Each bulb is held in a spring clamp 182 which is secured to a pivot block 183 mounted on a shaft 184 common to all of the clamp blocks and carried in the U-shape bracket 171. Each switch bulb 181 is adjustable as to position relative to the supporting bracket 171 and to effect a finer and more accurate adjustment, each block 183 is formed with a depending tongue 185 which projects below the supporting shaft 184.

This tongue is engaged on each side by an adjusting screw 186 which is threadedly mounted in a lug 187 formed in the bracket 171. After the switches have been adjusted they remain fixed in the shifting bracket 171 and move with it.

Two of the four switches 166, 167, 168, 169 have their contact points inserted in the left ends (Fig. 11) of the bulbs 181 and the other two switches have the contact points in the other ends. A switch is electrically closed when that end of the bulb which contains the contact points is moved sufficiently to flow the confined mercury on the contact points, this being the usual mercury switch construction. In the present switch unit, therefore, the direction and amount of shift of the disc 161 determines which switches are closed and which are opened.

The contact points are suitably connected by wires to a series of binding posts 191 (Figs. 10 and 11) which are carried in an insulated terminal block 192 extending above the switch elements and held fixed within the disc 161 by a screw 193.

The mechanical features of the stop units f, relating to the feeding of can ends from the magazine of the lining machine F or G will now be described and reference should be had to Figs. 9 and 18. This stop unit operates in connection with the bell crank lever 75 to prevent the forward movement of the slide bars 71 when the stop devices are actuated. This holds the projections 72 of the slide bars 71 in can end retaining position and therefore no ends are fed from the bottom of the stack into the lining head 66 although the feed slide 64 continues its regular forward and backward movement.

This stop device comprises a finger 201 which is hinged at one end on a pivot 202 carried in a bracket 203 bolted to the side of the lining machine table 61. The finger 201 is formed with a notch 204 which is directly over one side of the extension 84 of the bell crank lever 75. During the normal operation of the lining machine this finger is held in raised position (Fig. 9) so that it is clear of the extension of the bell crank lever and does not offer any resistance to the feeding action.

The finger is held in its raised, non-stop position by an electro-magnet 205 carried on the bracket 203 and located directly above the finger. When this electro-magnet 205 is energized its core attracts the finger 201 and holds it in raised position. The magnet is deenergized by actuation of elements either in the mercury switch element c for a low stack of ends in the magazine of the lining machine, or in the mercury switch g for an improperly positioned can end in the magazine. Either of these actuations cause the finger 201 to fall down of its own weight in position to prevent swinging of the bell crank lever 75 on its pivot 76. The mechanical features associated with the mercury switch g will now be considered and reference should be had to Figs. 9, 14, 15 and 16.

The switch elements g are contained within a casing or box 211 which is held adjacent the stack of can ends in the lining machine magazine, the box having a split clamping foot 212 which is mounted on the lower end of the short magazine rod 62 and is held in adjusted position on the rod by a setscrew 213. This box is closed with a cover plate 214 secured on its front side.

A lever arm 215 is hung on a horizontal pin 216 carried in the box 211 and one side of the box is slotted at 217 to accommodate this lever arm. The lower end of the arm is formed with a projection 218 which extends outside of the wall of the box and into the can end magazine. This lever arm is also pivotally connected to a link 219 located inside the box, the opposite end of the link being loosely carried on a screw 221 projecting forward from a block 222.

This block is pivoted at its upper end on a screw 223 threadedly engaging the back wall of the box. A spring 224 is connected at one end to a lug formed in a side wall of the box 211 and its opposite end is fastened on the screw 221. The spring tends to pull the block 222 into the position illustrated in Fig. 15. A finger latch 225 is also pivotally connected on the screw 221 its outer end projecting through the side of the box 211 which is slotted at 226 for this purpose.

The stack of can ends in the lining machine magazine, even when the stack is at its low position (L Fig. 9), extends past the projection 218 of the lever arm 215 and the adjacent side wall of the stack engaging the projection forces the lever arm back into the position illustrated in Fig. 14. This holds the block 222 against the action of the spring 224 and the finger latch 225 extends toward the left in its farthermost position. In the outer projected end of the latch a notch 227 is formed on its lower edge and this notch is located at such time beyond and clear of the wall of the box.

The ordinary can end 55 of the sanitary type is formed with a drawn central section or panel and one face of this usually projects beyond a plane passing through the curled flange of the end. In the can end lining machine these ends must all be turned the same way, that is with the flange groove turned up and the projecting central panels also up when the nozzle type is used. When these ends are all turned the same way they stack close together and their curled flanged peripheries present a substantially smooth unbroken outer wall surface for the stack as in Fig. 9.

If can ends are improperly stacked so that one or more ends are turned down while the others are up, for example, the continuity of the stack wall is broken and instead there is a space between those adjacent can ends which face in different directions. This is graphically illustrated at 229 in Figs. 14 and 15.

When such a space 229 aligns with the projection 218 of the lever arm 215 there is no longer any surface to hold the latter back and then the spring 224 pulls the lever arm out into the position illustrated in Fig. 15. This shifts the block 222 and the finger latch 225 into a position where the notch 227 of the latch is in engagement with the bottom edge of the slot 226. This now becomes a locked position.

A mercury switch bulb 231 is carried in clamps 232 secured to the block 222. This, like the mercury switch elements previously described, is also provided with contact points inserted in one end of the bulb. These contact points are suitably connected by wires to binding posts 233 carried on an insulated block 234 secured in the upper part of the box or casing 211.

In the position of the mercury switch unit 231 in Fig. 15 the unit closes an electric circuit which stops feeding of can ends from the stack and through the can end lining machine. When a condition of this kind occurs the misplaced can end must be taken out of the stack before can end lining can proceed. The can ends are manually withdrawn through the space between the short magazine rods 62, 63. The finger latch 225 prevents premature starting of the feeding while such a removal of ends is taking place and after all is again ready the latch is manually released to permit the covers in the stack coming again into normal operating position by engaging the projection of the lever arm 215 and again restoring the parts into the position of Fig. 14.

The wiring diagram of Fig. 19 will now be examined in detail and the different stop control circuits and the function of each will be observed. The electric controls operate on a closed circuit basis. This has been intimated in connection with the various solenoids described. If there is a failure of electric energy the machine units cannot operate. An electrical energy is supplied in any suitable manner as by a generator 240. Main service wires 241, 242 extend from opposite sides of the generator and all of the electric controls are connected with these wires.

The diagram of Fig. 19 may be fancifully divided into three vertically extending sections. The first to the left relates broadly to the can end lining machine F, the middle section to the liner G and the right section to the forming press A. A rough horizontal division may further be made as to the controls in the two lining machines. In the top division controls c located in the runway boot E are embodied. In the middle sections switches e of the respective runways H and J are shown, while the lower part of the view contains the switches g and stop devices f of the misplaced ends stack controls.

As long as the can ends produced by the press A are normally received by the can end liners F, G solenoid 114 of the stop unit a is energized, current then flowing from the wire 241 by way of a wire 243 which may pass through a lamp 244 and a closed service switch 245 and thence through the winding of the solenoid and back to the line 242 by way of a wire 246.

Each solenoid 101 of the runway dividing switch e for the runway boot E when energized to hold its diverting fingers 93 in their normal positions of Fig. 7, receives current from the wire 241 by means of a wire 247 which may pass through a lamp 248 and a closed service switch 249 thence through the solenoid winding and out by way of a wire 250 back to the wire 242. The trip finger 151 in each runway H, J at such a time is in the normal position (N in Fig. 9).

During the normal working condition as is now being considered the solenoid 205 of the stop unit f in each lining machine F and G is energized, current flowing from the wire 241 through a wire 251 in which a lamp 252 and a service switch 253 may be included. The wire 251 joins with a wire 254 leading into one side of the solenoid winding and a wire 255 connects the other side of the winding with the line wire 242.

All of the mercury switches, during normal conditions, are open as indicated in the wiring diagram (Fig. 19). When one or more switches are closed corresponding shunt circuits are established which affect the normal operation in one way or another as will now be considered.

Deenergizing of either of the solenoids 101 by its associated trip device d and switches e in either runway H or runway J is done in a certain manner and a description of the solenoid 101 related to the lining machine F will be given as an example. Such a description will apply equally well to the liner G in three out of four of the controls. The second control, which is an exception, concerns the timing switch b and this difference between the two lining machine controls will be pointed out in its proper place.

An accumulation of can ends will first be considered when the stack of ends in the magazine for the lining machine F builds up to the intermediate high (IH Fig. 9) position, the raised trip finger 151 of the associated trip device d locates the bracket 171 of its switch unit e so that the mercury switch 168 is closed. The bracket is turned counter clockwise, Fig. 19. This establishes a shunt circut which changes the conveyor boot switch and diverts the flow of can ends normally passing into the runway H so that its line of can ends passes into the runway J of the other lining machine.

This is done by deenergizing the front solenoid 101 (Fig. 7) so that its spring 107 shifts its finger 93 into diverting position. Current flowing in this shunt circuit passes from the wire 241 by way of a wire 261 leading through the switch 168 and thence by a wire 262 and a wire 263 back to the line wire 242. This path of travel offers less resistance to the current than through the solenoid 101 and the latter is therefore deenergized as long as the switch 168 remains closed. The lining machine G thereupon receives can ends from both lanes and no can ends pass into the runway H from the boot E.

If for any reason the can ends stack up further in the magazine, as by failure of their usual removal from the filled magazine by the lining machine F or in the event that the other magazine of the lining magazine G is also over filled the top of the stack may reach to its high level (H Fig. 9). Then the trip finger 151 is further raised and this in turn shifts the position of the bracket 171 (counter clockwise Fig. 19) so that the switch 169 as well as the switch 168 is closed.

Switch 169 is connected with the feeding of the strips 38 in the press A and is also electrically connected with the timing switch b. If at the closing of the mercury switch 169, the timing switch is properly positioned (that is if the correct circuit is closed for that particular lining machine) a shunt circuit is formed which will by-pass the electrical energy flowing through the solenoid 114 of the stop device a and deenergize this solenoid whereupon the spring 115 moves the stop finger 109 into the path of travel of the strip inserting finger 44, this action preventing the further feeding of a strip 38 held on the suction cups 42.

The path of travel of the current in such a shunt circuit (for liner F) is by way of a wire 265 which joins with the wire 243 and leads into the mercury timing switch 121 and thence by a wire 266 to the switch 169 and a wire 267 joining the opposite side of switch 169 with the wire 262, the current thence passing by way of the wire 263 back to the line wire 242.

In the event that the mercury switch 121 is not in closed position this shunt circuit will not be established at that time and it often happens that before the next shift in the timing switch b, which will close the mercury switch 121, the high condition of the magazine stack will be sufficiently reduced to open the switch 169. Should the over crowded condition obtain, however, or should the switch 121 of the timing switch b be in proper position as aforesaid the feeding of the strip 38 into the press is prevented.

Corresponding shunt circuits such as have just been described operate in the runway J when the bracket 171 of its switch unit e is positioned to close the switch 168 and the switches 168 and 169. Duplicate wiring is used in the case of the switch 168 but a slightly different wiring for the switch 169 includes the mercury switch 122 of the timing switch b in place of the mercury switch 121. This is the exception previously noted. The liner G shunt circuit for its switch 169 utilizes a wire 275 leading from the wire 243 into the mercury switch 122 and out by way of a wire 276 passing into the switch 169 and thence by way of a wire 277 which connects with the wire 262, the current thence being conducted by the wire 263 back into the line wire 242.

It will be observed if a high condition exists in both magazines each shift of the timing switch c will alternately produce the proper shunt circuit first through switch 121 then through switch 122 and vice versa so that the solenoid 114 will continue to be deenergized and no feeding of strips 38 will take place.

In a crowded runway condition as has just been described it will be observed that the controls for the lining machine F, as an example, are concerned with preventing the feeding of more can ends into its magazine. In the next control condition to be considered, which relates to a low stack of can ends, that is a deficiency of ends in the magazine, the operation of a control device is associated with the other lining machine feed, that is liner G feeding from the runway boot E. For such an interlapping of functions the electric controls cross over as between the two lining machines and when a deficiency of can ends takes place in the runway H of the lining machine F the usual effect is to stop the feeding of the ends into the lining machine G so that its supply will be diverted into the runway H to make up the deficiency.

The same thing applies and by duplicate means in connection with building up a supply of can ends in the magazine of the lining machine G when there is a deficiency in its runway J. At such time the usual effect is for the diverted can ends to pass into the lining machine F so that its deficiency may be relieved.

When the top of the stack of ends in the magazine of liner F only reaches to the intermediate low line (IL Fig. 9) its switch bracket 171 is moved as the finger 151 falls down to engage the top of the stack. This movement of the bracket is in a clockwise direction (Fig. 19) and the mercury switch 167 is closed. This forms a shunt circuit which leads into the solenoid 101 on the rear lane of can ends (Fig. 7) of the conveyor boot E.

The current thereupon flows from the wire 247 of the lining machine G by way of a wire 281 leading directly into the mercury switch 167 which, being closed, carries the current through a wire 282 leading to the wire 263 and thence to the line wire 242. This circuit offers less electrical resistance than the solenoid circuit and accordingly the solenoid 101 is deenergized so that the rear finger 93 (Fig. 7) is raised as the spring 107 of the solenoid lifts its core 103.

It may be that this diverting of can ends from the lining machine G is sufficient to make up the deficiency of ends in the magazine of the lining machine F but if not and the stack of ends continues to lessen so that the uppermost can end in the magazine reaches the low point (L Fig. 9) then the mercury switch 166 is also closed by further turning of its bracket 171. This establishes a second shunt circuit which relates to the feeding of the can ends from the bottom of the magazine of the liner F. Current for this shunt circuit flows from the wire 251 along a wire 283 into the switch 166 and out by way of a wire 284 to the wire 263 and thence to the line wire 242.

It will be observed that this control is concerned only with operating parts in the lining machine F. The electrical resistance of the shunt circuit through the switch 166 is less than through the winding of the solenoid 205 and the latter is therefore deenergized permitting the stop finger 201 of the unit f to fall in locking position to hold the bell crank lever 75 and the supporting bars 71 so that can ends will not be fed from the magazine. A duplicate operation applies to the closing of the mercury switch 166 in the switch unit e for runway J of the lining machine G.

The only other electric control now to be considered relates to the stopping of the can end feeding devices in a lining machine when a can end is in inverted position within its magazine, this condition utilizing the trip device g. When a can end is improperly fed and the mercury switch 231 of device g is rocked into closed position the shunt circuit is established which cuts out the solenoid 205 and stops the feeding of the can ends from the magazine the same as before for a low stack.

This shunt circuit comprises a wire 286 which connects the wire 251 with one terminal of the mercury switch 231, its other contact point being connected by a wire 287 to the wire 263. Current flowing along this circuit is of less electrical resistance than the resistance of the winding of solenoid 205 and it is therefore deenergized. Can ends therefore are held against feeding to the lining machine operation until the mercury switch 231 is again restored to open position by unlatching of the member 225 (Fig. 14) and the repositioning of the lever arm 215 as has already been fully described.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a control device for a line of can machinery or the like, the combination of a pair of magazines for receiving can parts, means for conveying can parts to each of said magazines, and means associated with each of said conveying means and operable in accordance with the quantity of can parts in its magazine for diverting the can parts thereto from the conveying means of the other magazine when the quantity of can parts in the former magazine falls below a predetermined amount.

2. In an electric control device for a line of can machinery or the like, the combination of a plurality of magazines, means for conveying a supply of can parts to said magazines, means associated with said conveying means for diverting can parts intended for one magazine into a conveyor leading to another magazine, and electric means operable by said can parts in a said magazine for actuating said diverting means.

3. In an electric control device for a line of can end making machinery, the combination of a can end conveyor divider, a pair of can end magazines associated with said divider, means also associated with said divider for directing said can ends into said magazines, and electric means associated with said magazines for controlling said directing means to pass can ends to both of said magazines simultaneously when each magazine is only normally filled or to divert all of the can ends to one of said magazines when the other magazine is filled beyond a predetermined point.

4. In a control device for a line of can end making machinery, the combination of a can end forming press, a pair of can end magazines, a can end conveyor leading to each magazine from said forming press, means associated with each magazine and operable by said can ends therein for directing all of the can ends from said forming press to one magazine when the supply of ends therein falls below a predetermined low point.

5. In an electric control device for a line of can end making machinery, the combination of a can end forming press, a pair of can end magazines, a can end conveyor leading to each magazine from said forming press, means associated with each magazine conveyor for directing said can ends into said conveyors, and electric means operable by said ends in said magazines for partially cutting off the supply of said can ends from said press when the quantity of ends in only one magazine reaches a predetermined high level.

6. In an electric control device for a line of can end making machinery, the combination of a can end forming press, a pair of can end magazines, a can end conveyor leading to each magazine from said forming press, means associated with each magazine conveyor for directing said can ends into said conveyors, and electric means operable by said ends in said magazines for entirely cutting off the supply of said can ends from said press when the quantity of ends in both magazines reaches predetermined high levels.

7. In an electric control device for a line of can end making machinery, the combination of a press for producing can ends from strips of sheet material, means for feeding said strips to said press, a plurality of can end magazines for holding said can ends in stacked formation, a conveyor system for transporting said can ends from said press to said magazines, means interposed in said conveyor system for distributing said can ends to said magazines, and electric control devices operable by said ends in said magazines for stopping the operation of said strip feeding means when the quantity of can ends in any of said magazines reaches a predetermined high level.

8. In an electric control device for a line of can end making machinery, the combination of a press for producing can ends from strips of sheet material, means for feeding said strips to said press, a plurality of can end magazines for holding said can ends in stacked formation, a conveyor system for transporting said can ends from said press to said magazines, means interposed in said conveyor system for distributing said can ends to said magazines, electric control devices operable by said ends in said magazines for stopping the operation of said strip feeding means when the quantity of can ends in a magazine reaches a predetermined high level, and means associated with said press for selectively timing a said electric control device of each magazine for a predetermined point in the cycle of operation of said strip feeding means.

9. In an electric control device for a line of can end making machinery the combination of a press for producing can ends from strips of sheet material, means for feeding said strips to said press, a pair of can end magazines for holding said can ends in stacked formation, a conveyor system for transporting said can ends from said press to said magazines, means interposed in said conveyor system for distributing said can ends to said magazines, electric control devices including electric circuits operable by said ends in said magazines for stopping the operation of said strip feeding means when the quantity of can ends in a magazine reaches a predetermined high level, and a timing switch associated with said press for alternately closing said circuits for a high level condition in either of said magazines.

10. In an electric control device for a line of can end making machinery the combination of a can end runway, a plurality of can end magazines connected with said runway, means associated with each of said magazines for releasing said can ends therefrom, a can end conveyor leading to each magazine from said runway, means associated with said runway for directing said can ends into said conveyor, and electric means operable by said ends in said magazines for stopping the operation of said can end releasing means of a said magazine in which the supply of said can ends has fallen below a predetermined low level.

11. In an electric control device, the combination of a magazine for holding can ends in stacked formation, means for releasing said ends from said magazine, and an electric control device operable by an inverted can end in said magazine for stopping the operation of said can end releasing means.

12. In an electric control device, the combination of a magazine for holding can ends in stacked formation, means for releasing said ends from said magazines, an electric control device operable by a misplaced can end in said stack for stopping the operation of said can end releasing means, and means for locking said electric control device in position to hold said releasing means inoperative as long as said misplaced can end is in said stack.

13. In an electric control device for a line of can end making machinery, the combination of a press for producing can ends from strips of sheet material, means for feeding said strips to said press, a plurality of can end magazines for holding said can ends in stacked formation, a conveyor system for transporting said can ends from said press to said magazines, means interposed in said conveyor system for distributing said can ends to said magazines, electric control devices operable by said ends in a said magazine for actuating said distributing means to divert said can ends to another of said magazines when a magazine is filled beyond a predetermined point, and other electric control devices for stopping said strip feed means when said can ends in said filled magazine reach a higher level.

14. In an electric control device for a line of can end making machinery, the combination of a can end runway, a pair of can end magazines, a can end conveyor leading to each magazine from said runway, means associated with said runway for diverting said can ends into said conveyors, and electric means operable by said ends in said magazines for actuating said diverting means to direct said can ends into one magazine away from a second magazine when it is filled beyond a predetermined high point and to direct all can ends into said second magazine when said can ends in its magazine fall below a predetermined low point.

15. In an electric control device for a line of can end making machinery, the combination of a can end runway, a pair of can end magazines, means associated with each of said magazines for releasing can ends therefrom, a can end conveyor leading to each magazine from said runway, means associated with said runway for diverting said can ends into said conveyors, electric means operable by said ends in said magazines for actuating said diverting means to direct all of the can ends to a magazine in which the supply of ends has fallen below a predetermined low point, and other electric means for stopping the operation of the can end releasing means associated with said magazine when the supply of ends therein falls yet further below the said predetermined low level.

16. In an electric control device for a line of can end making machinery, the combination of a press for producing can ends from strips of sheet material, means for feeding said strips to said press, a plurality of can end magazines for holding said can ends in stacked formation, means associated with each of said magazines for releasing can ends therefrom, a conveyor system for transporting said can ends from said press to said magazines, means interposed in said conveyor system for distributing said can ends to said magazines, electric control devices operable by said ends in said magazines for diverting the ends away from a magazine when it becomes filled beyond a predetermined high point, a second set of electric control devices for diverting all can ends into said magazine when the can ends therein fall below a predetermined low point, a third set of electric control devices for stopping said strip feeding means of said press when the can ends in said magazine reach a higher level than said predetermined high point, and a fourth set of electric control devices for stopping the operation of the said associated can end releasing means when the can ends in said magazine fall to a lower level than said predetermined low point.

WILLIAM J. PHILP.